(12) United States Patent
Kim et al.

(10) Patent No.: US 10,445,510 B2
(45) Date of Patent: *Oct. 15, 2019

(54) DATA CHECKING APPARATUS AND METHOD USING SAME

(71) Applicant: Industry-Academic Cooperation Foundation, Dankook University, Gyeonggi-do (KR)

(72) Inventors: Joonmo Kim, Gyeonggi-do (KR); Younggeun Choi, Gyeonggi-do (KR)

(73) Assignee: INDUSTRY-ACADEMIC COOPERATION FOUNDATION, DANKOOK UNIVERSITY, Gyeonggi-Do (KR)

( * ) Notice: Subject to any disclaimer, the term of this patent is extended or adjusted under 35 U.S.C. 154(b) by 3 days.

This patent is subject to a terminal disclaimer.

(21) Appl. No.: 15/392,021

(22) Filed: Dec. 28, 2016

(65) Prior Publication Data
US 2017/0308708 A1    Oct. 26, 2017

(30) Foreign Application Priority Data
Apr. 22, 2016    (KR) .......................... 10-2016-0049398

(51) Int. Cl.
*H04L 29/06*    (2006.01)
*G06F 21/60*    (2013.01)
(Continued)

(52) U.S. Cl.
CPC .......... *G06F 21/602* (2013.01); *G06F 21/554* (2013.01); *G06F 21/606* (2013.01);
(Continued)

(58) Field of Classification Search
CPC .... G06F 21/602; G06F 21/554; G06F 21/606; G06F 7/588; G06F 21/86;
(Continued)

(56) References Cited

U.S. PATENT DOCUMENTS 4,799,061 A   1/1989   Abraham et al.
5,623,548 A   4/1997   Akiyama et al.
(Continued)

FOREIGN PATENT DOCUMENTS

AU   2015 202 697 A1   3/2016

OTHER PUBLICATIONS

"Extended European Search Report Issued in European Application No. 16206755.7-1870", dated Aug. 21, 2017, 8 Pages.
(Continued)

*Primary Examiner* — Kendall Dolly
(74) *Attorney, Agent, or Firm* — Talem IP Law, LLP

(57) ABSTRACT

A data checking device that is connected to a communication entity includes: a port unit configured to communicate with the communication entity; a key storage unit configured to store predetermined keys; an encryption/decryption unit configured to encrypt or decrypt data transmitted from the communication entity through the port unit by using a first key among the predetermined keys; an output unit configured to output decrypted data; and a connection unit configured to physically connect the data checking device with another device storing keys which are identical to the predetermined keys. The predetermined keys stored in the key storage unit are generated and stored when the data checking device is connected to the another device by the connection unit.

5 Claims, 5 Drawing Sheets

(51) Int. Cl.
*G06F 21/55* (2013.01)
*H04L 9/08* (2006.01)
*H04L 9/14* (2006.01)
*G06F 21/86* (2013.01)
*H04W 12/04* (2009.01)
*H04W 12/12* (2009.01)
*G06F 7/58* (2006.01)
*H04W 12/00* (2009.01)

(52) U.S. Cl.
CPC .............. *H04L 9/0894* (2013.01); *H04L 9/14* (2013.01); *H04L 63/0435* (2013.01); *H04L 63/107* (2013.01); *G06F 7/588* (2013.01); *G06F 21/86* (2013.01); *G06F 2221/2143* (2013.01); *H04W 12/00503* (2019.01); *H04W 12/04* (2013.01); *H04W 12/12* (2013.01)

(58) Field of Classification Search
CPC . G06F 2221/2143; H04L 9/14; H04L 9/0894; H04L 63/107; H04L 63/0435; H04W 12/00503; H04W 12/12; H04W 12/04
See application file for complete search history.

(56) References Cited

U.S. PATENT DOCUMENTS

| | | |
|---|---|---|
| 6,272,634 B1 | 8/2001 | Tewfik et al. |
| 6,675,153 B1 | 1/2004 | Cook et al. |
| 7,010,689 B1 | 3/2006 | Matyas, Jr. et al. |
| 7,159,114 B1 | 1/2007 | Zajkowski et al. |
| 2002/0131592 A1 | 9/2002 | Hinnant |
| 2002/0184492 A1 | 12/2002 | Hori et al. |
| 2004/0260927 A1 | 12/2004 | Grobman |
| 2005/0027997 A1 | 2/2005 | Ueno et al. |
| 2005/0031119 A1 | 2/2005 | Ding |
| 2005/0129239 A1 | 6/2005 | Farley et al. |
| 2005/0172134 A1 | 8/2005 | Thorton et al. |
| 2005/0242987 A1 | 11/2005 | Umeno |
| 2006/0168609 A1 | 7/2006 | Chen |
| 2007/0076877 A1 | 4/2007 | Camp, Jr. et al. |
| 2007/0150737 A1 | 6/2007 | Parupudi et al. |
| 2007/0189521 A1 | 8/2007 | Ikushima et al. |
| 2008/0037785 A1 | 2/2008 | Gantman et al. |
| 2008/0235518 A1 | 9/2008 | Chen et al. |
| 2008/0253563 A1 | 10/2008 | Chang |
| 2008/0260148 A1 | 10/2008 | Lee et al. |
| 2010/0174919 A1 | 7/2010 | Ito et al. |
| 2012/0237024 A1 | 9/2012 | Liu et al. |
| 2012/0250863 A1* | 10/2012 | Bukshpun ............ H04L 9/0838 380/278 |
| 2013/0054934 A1 | 2/2013 | Mitsugi et al. |
| 2013/0067229 A1 | 3/2013 | German et al. |
| 2013/0149959 A1 | 6/2013 | Beadle et al. |
| 2013/0318351 A1 | 11/2013 | Hirano et al. |
| 2014/0136835 A1 | 5/2014 | Sharpe |
| 2014/0223129 A1 | 8/2014 | McCoy |
| 2014/0324870 A1 | 10/2014 | Kami |
| 2015/0200773 A1 | 6/2015 | Sella et al. |
| 2015/0326392 A1 | 11/2015 | Cheng et al. |
| 2016/0006710 A1* | 1/2016 | Palme .................. H04L 9/0816 380/260 |
| 2017/0180391 A1 | 6/2017 | Hinchliffe et al. |

OTHER PUBLICATIONS

"Non-Final Office Action Issued in U.S. Appl. No. 15/392,033," dated Sep. 21, 2018, 31 Pages.

* cited by examiner

DATA CHECKING APPARATUS AND METHOD USING SAME

TECHNICAL FIELD

The present invention relates to a data checking device and a data checking method performed by the data checking device. More specifically, the present invention relates to a data checking device and method that prevents keys used for encrypting/decrypting data from being taken and hacked by a malicious attacker in such a manner that the keys for encrypting/decrypting data are shared (distributed) between devices only when the devices can be physically connected to one another. In addition, the data checking device and method allows a user to check whether the data is tampered with in a terminal device carried by the user or in a server providing service to the terminal device.

BACKGROUND ART

With the development of the Internet, most of the services in modern society can be carried out online. For example, civil affairs such as issuing a copy of resident registration can be handled online as well as financial transactions, and buying and selling goods.

Such services deal with information such as personal information or financial transaction information. Accordingly, in order to transmit and receive information under these services, techniques for enhancing security are essentially required.

As a well-known technique for enhancing security in information transmission/reception, there is a technique using RSA, which is a system for encrypting and decrypting data using asymmetric keys. In the RSA system, data is encrypted based on a public key and a private key and is transmitted over a communications network. However, the public key is disclosed and shared on the Internet. Accordingly, if a private key is found based on the public key, the encrypted data may be hacked. Although it is known that it is very difficult to find a private key based on a public key, it is not mathematically impossible. Therefore, it can be said that such an RSA system has a weakness in security.

In order to further enhance security, various security media such as an authentication certificate, an one time password (OTP), a security card, an I-PIN, etc. are utilized.

However, even if such security media including an OTP are utilized, it is not possible to ensure security when a user's terminal device or a server providing service to the user through the user's terminal device is infected with a malicious code. For example, when a user's terminal device accesses a phishing site, it is difficult for the user to recognize it even by utilizing both the RSA system and the OTP. Therefore, financial transaction accidents or personal information leakage may take place.

RELATED ART REFERENCE

Patent Reference (Patent Document 1) Korean Laid-Open Patent Publication No. 2005-0017493 (published on Feb. 22, 2005)

SUMMARY OF THE INVENTION

An object is to provide a technique that eliminates the chance that a malicious attacker takes keys used for the encryption/decryption of data, while allowing a user to check whether the user's request has been tampered with in the user's terminal device or a server processing such request when the user's request is processed.

It is to be noted that the objects are not limited thereto.

In accordance with an aspect, there is provided a data checking device that is connected to a communication entity includes: a port unit configured to communicate with the communication entity; a key storage unit configured to store predetermined keys; an encryption/decryption unit configured to encrypt or decrypt data transmitted from the communication entity through the port unit by using a first key among the predetermined keys; an output unit configured to output decrypted data obtained from the encryption/decryption unit; and a connection unit configured to physically connect the data checking device with another device storing keys which are identical to the predetermined keys, wherein the predetermined keys stored in the key storage unit are generated and stored when the data checking device is connected to the another device by the connection unit.

The encryption/decryption unit may be connected to the key storage unit through a key bus, and perform encryption or decryption based on a key received from the key storage unit through the key bus The port unit may be connected to the encryption/decryption unit through a data bus, and data encrypted or decrypted by the encryption/decryption unit may be transferred to the communication entity by the port unit through the data bus The encryption/decryption unit may combine the data transmitted from the communication entity with a key identifier known to both of the data checking device and the another device to generate combined data, and then encrypt the combined data based on the first key, and the port unit may transfer the encrypted, combined data to the communication entity The encryption/decryption unit may generate the key identifier based on at least two keys, among the predetermined keys, which are known to both of the data checking device and the another device.

The device may further include: a random number generation unit configured to generate random numbers, and the key identifier may include a predetermined number of bits, in which values of some of the bits may be determined based on the at least two keys, and values of the remainder of the bits may be determined by the generated random numbers.

The encryption/decryption unit may separate an encrypted key identifier used for identifying the first key from the encrypted data, and decrypt the separated, encrypted key identifier by using each of the predetermined keys, and wherein the encryption/decryption unit decrypts the encrypted data by using a key which has been used in decrypting the encrypted key identifier if the decrypted key identifier is identical to a key identifier stored in the data checking device.

The output unit may include a display configured to display the decrypted data in a text format.

The device may further include: a protection unit configured to recognize that an abnormal action is made to the data checking device, and to delete the predetermined keys upon recognizing that the abnormal action is made In accordance with another aspect, a data checking method performed by a data checking device connected to a communication entity includes: receiving encrypted data from the communication entity; decrypting the encrypted data by using a first key among predetermined keys; and outputting decrypted data obtained by the decrypting, wherein the predetermined keys are created and stored when the data checking device is physically connected through a connection unit included in the data checking device to another device storing keys which are identical to the predetermined keys.

The decrypting may include: separating an encrypted key identifier used for identifying the first key from the encrypted data; decrypting, by using each of the predetermined keys, the encrypted key identifier separated from the encrypted data; and decrypting the encrypted data by using a key which has been used in decrypting the encrypted key identifier if the decrypted key identifier is identical to a key identifier stored in the data checking device.

The method may further include: recognizing that an abnormal action is made to the data checking device; and deleting the keys upon recognizing that the abnormal action.

According to an embodiment, a malicious attacker cannot access and take keys used for encryption/decryption of data. Therefore, the malicious attacker can neither decrypt encrypted data nor tamper with the data.

In addition, the user can check whether or not user's request has been tampered with in the terminal device or the server processing the request when the user's request is processed. Accordingly, it is possible to prevent accidents such as financial transaction accidents, personal information leakage, etc.

DETAILED DESCRIPTION OF THE PREFERRED EMBODIMENTS

Advantages and features and methods to achieve them will become apparent from the descriptions of embodiments hereinbelow with reference to the accompanying drawings. However, the present invention is not limited to embodiments disclosed herein but may be implemented in various different ways. The embodiments are provided for making the disclosure thorough and for fully conveying the scope to those skilled in the art. It is to be noted that the scope is defined only by the claims.

Detailed descriptions of well-known functions and structures incorporated herein will be omitted to avoid obscuring the subject matter. Further, the following terminologies are defined in consideration of the functions in the present invention and may be construed in different ways by the intention of users and operators. Therefore, the terms, such as those defined in commonly used dictionaries, should be interpreted as having a meaning that is consistent with their meaning in the context of the relevant art and/or the present application.

Figure 1:
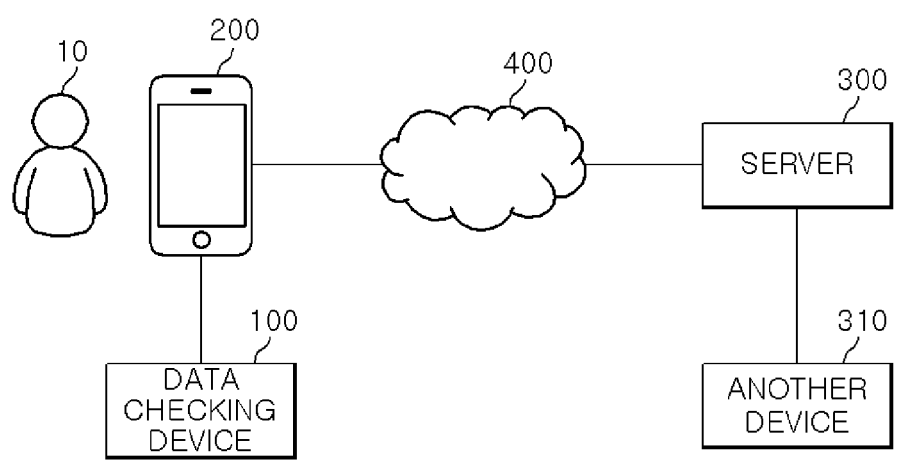
FIG. 1 is a view conceptually illustrating a system employing a data checking device according to an embodiment of the present invention.

FIG. 1 is a view conceptually illustrating a system employing a data checking device according to an embodiment.

Referring to FIG. 1, the system may include a data checking device 100, a terminal device 200 and a server 300 that has another device 310 or is connected to the another device 310. The terminal device 200 and the server 300 are connected with each other through a network 400. The network 400 may be either a wireless communications network such as CDMA, 3G, 4G, LTE-A, Bluetooth, Wi-Fi, NFC or IR network, or a wired communications network such as a LAN.

The terminal device 200 may receive a request designated to the server 300 from a user 10, for example, a financial transaction request or a personal information request from the user 10 and may transmit such a request to the server 300. The terminal device 200 may be a device such as a PC, a smart phone, etc. carried by the user 10. In addition, the terminal device 200 may conduct communications with the data checking device 100 through communications using a sound wave, infrared communications, NFC, Wi-Fi, etc.

The server 300 may receive a request from the user 10 through the terminal device 200 and may provide the user 10 with a service in response to the request through the terminal device 200.

The server 300 and the terminal device 200 process the request from the user 10 as they transmit encrypted data therebetween or decrypt the encrypted data. In this regard, the terminal device 200 is connected to the data checking device 100 which decrypts the encrypted data received from the server 300 or encrypts the data to be transmitted to the server 300. Likewise, the server 300 is connected to another device 310 which decrypts the encrypted data received from the terminal device 200 or encrypts the data to be transmitted to the terminal device 200. The device 310 may be implemented, but is not limited to, as a hardware device connected to (attached to) the server 300, such as a dongle, or as software such as a program installed in the server 300.

The data checking device 100 and the device 310 may encrypt data or decrypt the encrypted data in the same manner. In addition, the data checking device 100 performs the function of outputting the data received from the terminal device 200 to the user 10. The data received by the data checking device 100 from the terminal device 200 may be either the same data as one received from the server 300 by the terminal device 200 or data obtained by processing the received data in a predetermined manner.

Hereinafter, the data checking device 100 will be described in more detail. It is assumed that the method of encrypting and decrypting data and the following description thereon are equally applied to the device 310 as well.

Figure 2:
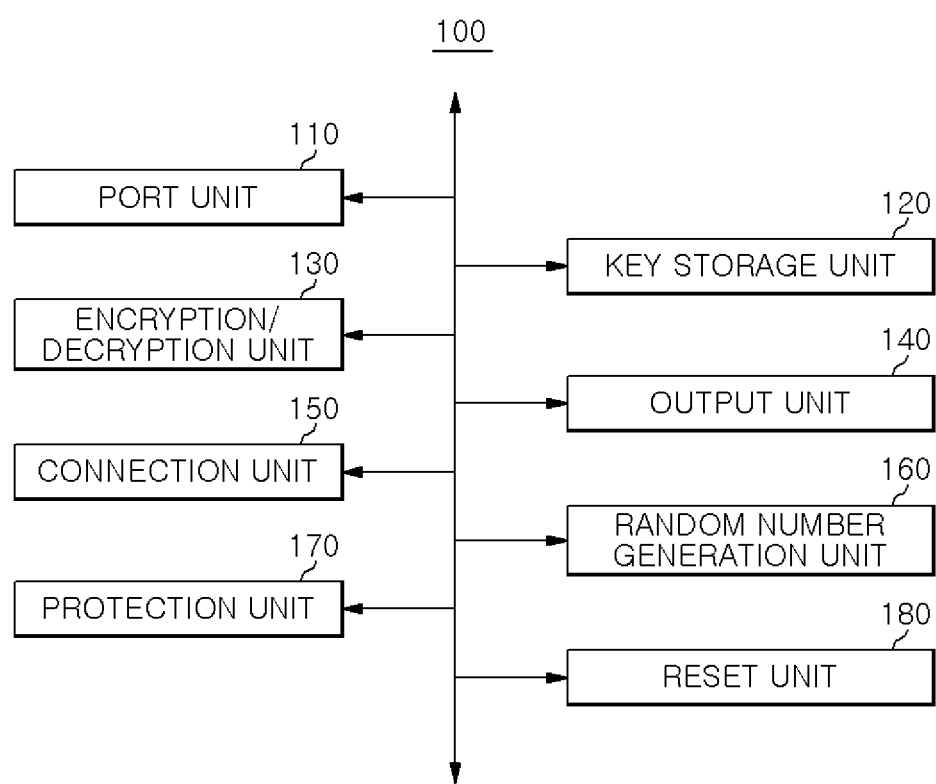
FIG. 2 is a diagram illustrating a configuration of a data checking device according to the embodiment.

FIG. 2 is a diagram illustrating the configuration of a data checking device according to an embodiment.

The data checking device 100 may include a memory that stores program instructions for performing the above-described functions and functions to be described below, and a processor that executes the instructions. In addition, the functions of the data checking device 100 may be implemented in a wearable device, especially a wearable device having a display for displaying an image or a text to a user. Such a wearable device may include, but is not limited to, a wrist-band, smart glasses or a smart watch, etc.

Referring to FIG. 2, the data checking device 100 includes a port unit 110, an encryption/decryption unit 130, an output unit 140, and a connection unit 150. In some embodiments, the data checking device 100 may further include a key storage unit 120, a random number generation unit 160, a protection unit 170 and a reset unit 180. That is, the data checking device 100 may further include elements not shown in FIG. 2 or may not include at least one of the elements shown in FIG. 2.

The connection unit 150 may physically connect the data checking device 100 with the device 310 on the side of the server 300 and may be, for example, implemented as a hardware device such as a connector.

Figure 3:
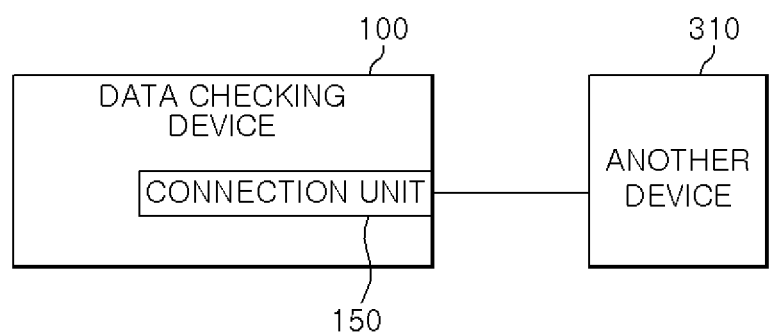
FIG. 3 is a diagram conceptually illustrating that a data checking device according to the embodiment is physically connected to another device encrypting/decrypting data.

Referring to FIG. 3, the data checking device 100 may be physically connected to the device 310 through the connection unit 150 included therein. The data checking device 100 may be physically connected to the device 310 in a factory at the time of production, or in a shop at the time of purchase, for example, but not limited thereto.

In the case where the device 310 is implemented in software such that it is installed in the server 300, the data checking device 100 may be connected to the device 310 while it is physically connected to the server 300.

Referring back to FIG. 2, the port unit 110 communicates with the terminal device 200 by exchanging data. The port unit 110 may include a communications module capable of supporting wireless communications, e.g., communications using a sound wave, infrared communications, NFC, Wi-Fi, etc.

The key storage unit 120 stores keys. Each of the keys is used to decrypt encrypted data and may also be used to encrypt unencrypted data. Each of such keys may be composed of a plurality of bits.

The keys may be generated based on random numbers generated by the random number generation unit 160, for example, 1,000 random numbers. An arbitrary number of the random numbers themselves may be used as the keys. Alternatively, an arbitrary number of the random numbers may be processed by a predetermined algorithm to then be used as the keys. The random number generation unit 160 may be implemented as a microprocessor.

The reset unit 180 generates a seed (a value used for generating random numbers) and provides it to the random number generation unit 160. The random number generation unit 160 generates random numbers based on the seed.

The seed generated by the reset unit 180 may be transferred to the device 310 when the data checking device 100 is physically connected to the device 310. That is, the seed is transferred neither through wireless communications nor through wired communications but is transmitted when the devices involved in encryption/decryption (the data checking device 100 and the device 310 in this embodiment) are physically connected to each other. Therefore, the seed is not transferred through the wireless or wired communications, such that the seed cannot be stolen by a hacker or the like.

The device 310 that has received the seed may generate random numbers using the same seed as one used by the random number generation unit 160 of the data checking device 100. Therefore, the random numbers stored in the key storage unit 120 have the same values as the random numbers stored in the device 310.

The reset unit 180 will be described in more detail below. The reset unit 180 may include a button or the like through which the user 10 performs input operations, and the like. The reset unit 180 is connected to the random number generation unit 160. Accordingly, when the data checking device 100 is physically connected to the device 310 and then the button of the reset unit 180 is pressed, the reset unit 180 generates a seed and provides the seed to the random number generation unit 160.

As described above, the data checking device 100 and the device 310 generate and share (distribute) the keys when they are physically connected to each other. That is, there is no process of transferring the keys through any communications network, neither a wired communications nor wireless communications. Therefore, unlike the existing RSA, it reliably eliminates the chance that the keys are leaked or hacked in the process of distributing and sharing the keys.

It is to be noted that the above-described process of generating and sharing the identical keys using the seed by the data checking device 100 and the device 310 is merely illustrative, and thus embodiments are not limited thereto. For example, the data checking device 100 and the device 310 may share keys having the same values by generating the keys by the data checking device 100 and then transferring the keys when the data checking device 100 is physically connected to the device 310, that is, without transmitting a seed.

The keys stored in the key storage unit 120 may be updated. The update may be performed periodically or whenever necessary. The data checking device 100 and the device 310 may have a predetermined rule for the timing of update, and therefore they can update the keys simultaneously.

In addition, the key updating means generating new keys, and accordingly the keys may also be generated based on the random numbers generated by the random number generation unit 160. When the keys are updated, the seed transferred to the random number generation unit 160 may be a predetermined value that is known between the data checking device 100 and the device 310, for example, the first or last key before the update. That is, the data checking device 100 and the device 310 generate keys with the same seed for updating the keys, and use the keys thus generated for updating. Therefore, even if keys are updated, the data checking device 100 and the device 310 can share the keys having the same value.

The encryption/decryption unit 130 encrypts data to be transmitted to the server 300 by the terminal device 200. More specifically, a first key is selected from the keys stored in the key storage unit 120. The first key may be chosen by the key storage unit 120 or the encryption/decryption unit 130. The encryption/decryption unit 130 encrypts data to be encrypted based on the first key. Any cryptographic algorithm known in the art may be used for encrypting the data based on the first key. Such a cryptographic algorithm may be stored in a ROM (not shown in FIG. 2). The data encrypted based on the first key can be decrypted only with the first key.

The encryption/decryption unit 130 decrypts the encrypted data received from the server 300 by the terminal device 200, and the algorithm for decrypting the encrypted data may also be stored in the above-mentioned ROM. More specifically, the encryption/decryption unit 130 decrypts the encrypted data using any one of the keys stored in the key storage unit 120.

Hereinafter, a process of encryption and a process of decryption will be described in detail.

The process of encryption will be described first. The encryption/decryption unit 130 generates a key identifier (also referred to as a control block) for identifying a key used for encryption. The generated key identifier is encrypted based on a key (first key) together with the data to be encrypted.

Figure 5A:
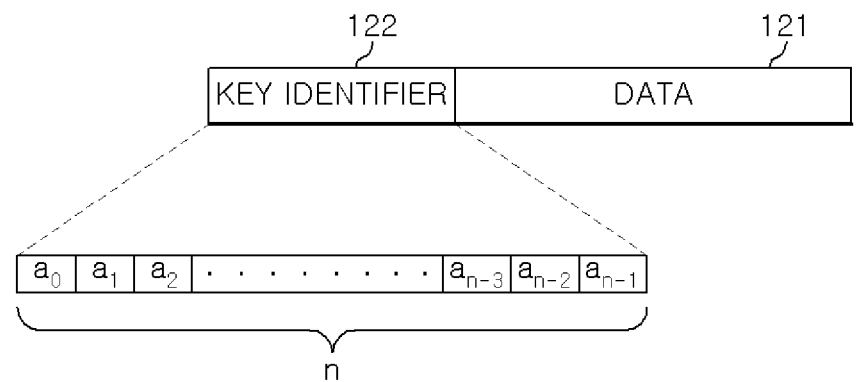
FIGS. 5A and 5B are diagrams conceptually illustrating a key identifier according to the embodiment.
Figure 5B:
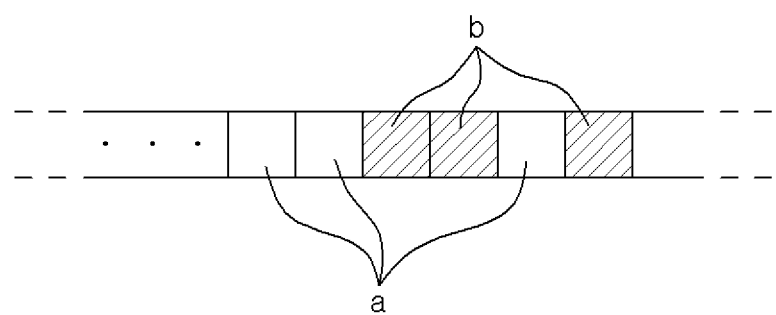

The key identifier will be described in more detail with reference to FIGS. 5A and 5B. FIG. 5A is a diagram illustrating combined data in which a key identifier and data are combined. Referring to FIG. 5A, the key identifier 122 may be composed of a predetermined number of bits, e.g., "n" bits. These "n" bits may be filled with the values according to a preset rule that is known to the data checking device 100 and the device 310. FIG. 5B is a diagram conceptually illustrating that "n" bits of a key identifier are filled with values according to the preset rule. Hereinafter, the rule will be described in more detail.

By using at least two predetermined keys among the keys, which are known to the data checking device 100 and the device 310, certain values are assigned to positions of the "n" bits. For example, let us assume that the data checking device 100 and the device 310 know that a key identifier is generated by using fifty keys, that is, the first key to the $50^{th}$ key, as the at least two predetermined keys among the keys. In addition, let us assume that a value obtained by performing a modular operation on the first key with n is the first value, and a value obtained by performing the modular operation on the second key with 2 is the second value, the second value is assigned to one of the "n" bits that is at the position indicated by the first value. Then, let us assume that a value obtained by performing the modular operation on the third key with n is the third value and a value obtained by performing the modular operation on the fourth key with 2 is the fourth value, the fourth value is assigned to one of the "n" bits that is at the position the bit indicated by the third value. In this manner, values are assigned to particular positions of the "n" bits, respectively, by using the fifty keys. If it is necessary to assign another value again to a position to which a value has already been assigned, the value obtained lately is assigned to the position. Thereafter, there may be bits among the "n" bits that are not assigned any values. Bits generated by the random number generation unit 150 are assigned to the bits to which no value is assigned. It is to be understood that, in some embodiment, the "n" bits may be assigned random numbers first, followed by the values obtained by using at least two keys.

FIG. 5B is a diagram conceptually illustrating the generation of a key identifier by the above-described process. Referring to FIG. 5B, among the "n" bits, the bits which are assigned values obtained by using at least two keys are represented by "b", and bits which are assigned random numbers generated by the random number generation unit 150 are represented by "a".

The data is encrypted together with the key identifier thus generated, and is transferred to the server 300 through the port unit 110.

Hereinafter, the process of decrypting will be described.

The encryption/decryption unit 130 separates the encrypted key identifier part from the encrypted data encrypted by the device 310. Then, the encrypted key identifier is decrypted by using each of the keys stored in the key storage unit 120. The encryption/decryption unit 130 compares the bits at the positions b of the decrypted key identifier where the values are assigned, with those of the key identifier which is generated or known to the encryption/decryption unit 130. If the values at the positions b are identical for both of the key identifiers, it is determined that the key used to decrypt the encrypted key identifier is the key used for the encryption. Accordingly, the encryption/decryption unit 130 decrypts the remaining part of the encrypted data by using the key determined as being used for the encryption. It is to be noted that the values at the positions a are random numbers and thus are not compared.

As such, when data is encrypted and decrypted by using the key identifier, a malicious attacker can encrypt and decrypt the data only if she/he knows all of the keys, the at least two keys used to generate the key identifier, and the above-mentioned method used to generate the key identifier. However, as described above, since the keys are shared by the data checking device 100 and the device 310 when they are physically connected to each other, there is no chance that the keys are stolen/leaked by a hacker. In addition, since the key identifier is installed in the ROM or the like during the initial process of producing the data checking device 100 or the device 310, a hacker cannot find out the key identifier.

The encryption method and the decryption method described above are equally performed in the device 310 as well. Therefore, the data encrypted by the device 310 may be decrypted by the data checking device 100, and the data encrypted by the data checking device 100 may be decrypted by the device 310. In addition, the encryption/decryption unit 130 may be implemented with a memory that stores program instructions to cause the data checking device 100 to perform the above-described functions, and a microprocessor that executes such instructions.

Figure 4:
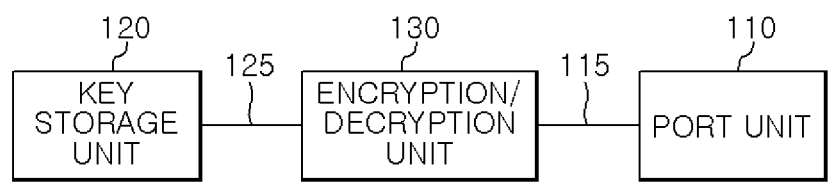
FIG. 4 is a diagram conceptually illustrating that a key storage unit and a port unit of the data checking device according to the embodiment are configured as separated elements.

The port unit 110 receives unencrypted data or encrypted data from the data checking device 100 and transfers it to the encryption/decryption unit 130, and receives the encrypted data from the encryption/decryption unit 130 and transfers it to the data checking device 100. Referring to FIG. 4, the port unit 130 is connected to the encryption/decryption unit 130 through a data bus 115. The data bus 115 is a path through which data is transmitted and received.

In addition, the encryption/decryption unit 130 receives keys from the key storage unit 120 and encrypts or decrypts data. Referring to FIG. 4, the key storage unit 120 is connected to the encryption/decryption unit 130 through a key bus 125. The key bus 125 is a path through which a key is transmitted and received.

The data checking device 100 transmits and receives the encrypted data to/from a communication entity such as the terminal device 200 through the port unit 110. The keys stored in the key storage unit 120 are transferred only to the encryption/decryption unit 130 through the key bus 125 for encryption/decryption of data, but are not transmitted to the outside through the port unit 110.

That is, there is no chance that the keys stored in the key storage unit 120 are not transmitted to the outside through the port unit 110. In addition, it is not possible to directly access the key storage unit 120 through the port unit 110 from the outside. Accordingly, the keys stored in the key storage unit 120 are not disclosed to the outside, and a hacker or the like cannot take the keys stored in the key storage unit 120.

The output unit 140 outputs the data decrypted by the encryption/decryption unit 130 as it is or data obtained by processing the decrypted data in a predetermined manner. The output unit 140 may be implemented as a display for displaying decrypted data in text format, for example, a touch screen.

Figure 6:
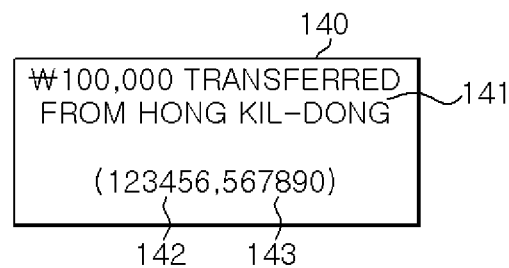
FIG. 6 is a diagram illustrating data decrypted by an output unit according to the embodiment.

FIG. 6 is a diagram illustrating an example of decrypted data displayed on the output unit 140 implemented as a display. Referring to FIG. 6, the output unit 140 displays a variety of information items 141 to 143.

According to an embodiment, the output unit 140 includes a pair of check numbers 142 and 143. Each of the check numbers may be a predetermined number of digits, for example, a six-digit number, which is randomly generated by the device 310 and encrypted based on the above-described encryption method.

The pair of check numbers 142 and 143 are decrypted by the encryption/decryption unit 130 and displayed on the output unit 140 as shown in FIG. 6. The user 10 enters the first number 142 of the pair of numbers to the terminal device 200 if the decrypted data 141 displayed on the output unit 140 matches the response to user's request. Then, the terminal device 200 transmits the entered number 142 to the server 300, and the server 300 executes the request from the user 10 based on the number 142. However, if the decrypted data 141 displayed on the output unit 140 does not match the response to the request of the user, the user 10 transmits the last number 143 of the pair of numbers to the server 300. The server 300 does not execute the request from the user 10 if the number received from the terminal device 200 are different from the number 142.

If a malicious attacker attempts to cause the server 300 to perform the request from the user 10, the malicious attacker should find out the 6-digit number 142 and enter it at a single trial. However, the six-digit number 142 has been arbitrarily specified and also encrypted by the device 310. Therefore, unless the malicious attacker knows the keys and the key identifier, the malicious attacker cannot decrypt and figure out the six-digit number 142. In addition, since the device 310 arbitrarily and randomly specifies and transmits the 6-digit number, it is impossible for the malicious attacker to luckily guess the 6-digit number at one trial. Thus, according to the embodiment, the user can check whether the user's request has been tampered with in the terminal device or in a server processing the request. Accordingly, it is possible to prevent accidents such as financial transaction accidents, personal information leakage, etc.

Referring back to FIG. 2, the protection unit 170 recognizes that an action defined as abnormal is made to the data checking device 100. When such an action is recognized, the protection unit 170 deletes the keys stored in the storage unit 120. The actions defined as abnormal may include, but is not limited to, an attempt to electronically copy keys stored in the key storage unit 120, an attempt to detect vibration or heat, etc. The protection unit 170 is to prevent an attempt to physically take keys by a hacker when she/he has failed to take keys online.

Figure 7:
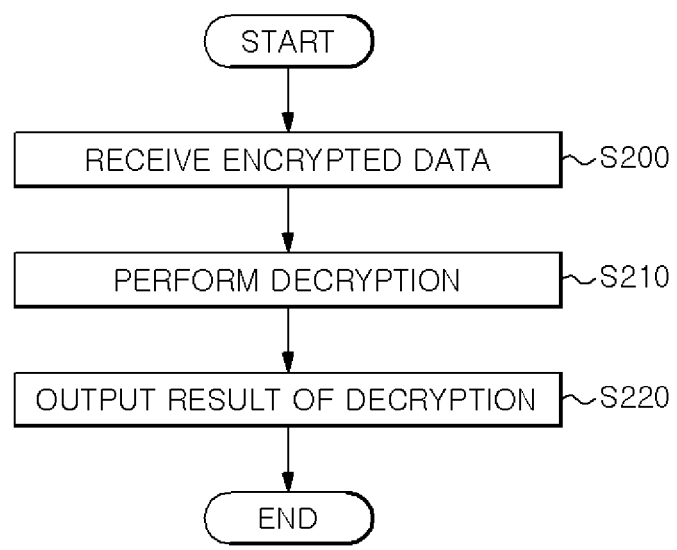
FIG. 7 is a flowchart for illustrating a procedure of a data checking method according to an embodiment.

FIG. 7 is a flowchart for illustrating a procedure of a data checking method according to an embodiment, which may be performed by the data checking device 100 described above. In addition, the data checking method to be described below may not include at least one of the steps to be described below or may further include an additional step. Further, the method may be performed in different orders from the order described below.

Referring to FIG. 7, the data checking method includes: receiving encrypted data from the communication entity (step S200); decrypting the encrypted data using a first key among predetermined keys (step S210); and outputting results of the decrypting (step S220). The keys are created and stored when the data checking device is physically connected through the connection unit 150 of the data checking device 100 to another device storing keys which are identical to the predetermined keys.

The subsequent steps of the data checking method will be not be described to avoid redundancy.

As described above, according to the embodiment, a malicious attacker cannot access and take the keys used for encryption/decryption of data. Therefore, the malicious attacker can neither decrypt encrypted data nor tamper with the data.

In addition, the user can check whether or not the user's request has been tampered with in the terminal device or the server when the user's request is processed. Accordingly, it is possible to prevent accidents such as financial transaction accidents, personal information leakage, etc.

Combinations of blocks in the accompanying drawings and steps in a flow chart may be performed according to computer program instructions. These computer program instructions can be installed in general-purpose computers, special-purpose computers or other processors of programmable data processing equipment. Therefore, the instructions executed by the processor of the computers or other programmable data processing equipment create means for performing functions described in the blocks of the block diagrams or in the steps of the flowchart. These computer program instructions can be stored in computer-usable or computer-readable memories which can assist in the computers or other processors of programmable data processing equipment to implement particular functions in particular manners. Therefore, the instructions stored in the computer-usable or computer-readable memories may be used to produce articles containing instruction means for performing the functions described in the blocks of the block diagrams or in the steps of the flowchart. The computer program instructions may also be installed in computers or other programmable data processing equipment. Therefore, a sequence of operation steps may be performed on the computers or other programmable data processing device to produce computer-executable processes so that the instructions operating the computers or other programmable data processing device may provide steps for performing the functions described in the blocks of the block diagrams or in the steps of the flowchart.

In addition, each block or each step may represent portions of modules, segments or codes including one or more executable instructions for executing a specified logical function(s). In addition, it should be noted that, in some alternative embodiments, the functions described in association with blocks or steps may be performed out of a specified sequence. For example, two consecutive blocks or steps may be performed substantially simultaneously or may be performed in the reverse order depending on the function to be performed.

The spirit of the present invention has been just exemplified. It will be appreciated by those skilled in the art that various modifications, changes, and substitutions can be made without departing from the essential characteristics. Accordingly, the embodiments described herein are merely illustrative and are not intended to limit the scope. The technical idea is not limited by the embodiments. The protection scope must be analyzed by the appended claims and it should be analyzed that all spirits within a scope equivalent thereto are included in the appended claims.

What is claimed is:

1. A data checking device connected to a communication entity, the data checking device comprising:
    a connection unit;
    a port unit configured to communicate with the communication entity;
    a key storage unit configured to generate a plurality of predetermined keys when the data checking device is connected to another device through the connection unit and store the plurality of predetermined keys, the plurality of the predetermined keys being shared with the another device;
    a random number generation unit configured to generate random numbers; and an encryption/decryption unit configured to encrypt data received from the communication entity through the port unit by using at least one of the predetermined keys;

wherein the encryption/decryption unit is configured to generate an identifier including a predetermined number of bits, combine the data received from the communication entity through the port unit with the identifier to generate combined data, and encrypt the combined data using a first key selected among the predetermined keys;

wherein the encrypted, combined data is transmitted to the communication entity through the port unit, wherein values of some of the bits of the identifier generated by the encryption/decryption unit are determined based on at least two keys among the predetermined keys and values of a remainder of the predetermined number of bits of the identifier are determined based on the random numbers generated by the random number generation unit, wherein the identifier indicates which key is used for encrypting data among the predetermined keys.

2. The data checking device of claim 1, wherein the encryption/decryption unit is connected to the key storage unit through a key bus, and the first key used for the encrypting of the combined data is received from the key storage unit through the key bus.

3. The data checking device of claim 2, wherein the port unit is connected to the encryption/decryption unit through a data bus, and wherein the data encrypted by the encryption/decryption unit is transferred to the communication entity through the port unit using the data bus.

4. A data checking method performed by a data checking device comprising a connection unit connected to a communication entity, the method comprising:

generating a plurality of predetermined keys when the data checking device is connected to another device through the connection unit, the predetermined keys being shared with the another device;

generating random numbers;

generating an identifier including a predetermined number of bits;

receiving data from the communication entity through the connection unit;

combining the received data with an identifier to generate combined data, wherein values of some of bits of the identifier are determined based on at least two keys among the predetermined keys and values of remainder of bits of the identifier are determined based on the generated random numbers;

encrypting the combined data using a first key selected among the predetermined keys, wherein the identifier indicates which key is used for encrypting data among the predetermined keys; and transmitting the encrypted, combined data to the communication unit through the port unit.

5. The method of claim 4, further comprising:

recognizing that an abnormal action is made to the data checking device; and deleting the predetermined keys upon recognizing that the abnormal action is made.

* * * * *